United States Patent
Miura

(10) Patent No.: US 6,981,369 B2
(45) Date of Patent: Jan. 3, 2006

(54) EXHAUST GAS CLEANING APPARATUS

(75) Inventor: Manabu Miura, Zushi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 14 days.

(21) Appl. No.: 10/883,762

(22) Filed: Jul. 6, 2004

(65) Prior Publication Data

US 2005/0022503 A1 Feb. 3, 2005

(30) Foreign Application Priority Data

Jul. 30, 2003 (JP) ............................. 2003-282954

(51) Int. Cl.
*F01N 3/00* (2006.01)
(52) U.S. Cl. ...................... 60/285; 60/274; 60/286; 60/297
(58) Field of Classification Search .................. 60/274, 60/278, 280, 285, 286, 297, 301
See application file for complete search history.

(56) References Cited

U.S. PATENT DOCUMENTS

| | | | |
|---|---|---|---|
| 6,178,943 B1 * | 1/2001 | Taga et al. ................... | 123/295 |
| 6,289,672 B1 * | 9/2001 | Katoh et al. .................. | 60/285 |
| 6,519,933 B2 * | 2/2003 | Ogiso et al. .................. | 60/285 |
| 6,698,185 B2 * | 3/2004 | Kitahara ....................... | 60/274 |
| 6,834,497 B2 * | 12/2004 | Miyoshi et al. ............... | 60/277 |

FOREIGN PATENT DOCUMENTS

| | | |
|---|---|---|
| DE | 19939053 A1 | 2/2001 |
| EP | 0926327 A | 6/1999 |
| EP | 1079091 A | 2/2001 |
| EP | 1103711 A | 5/2001 |
| JP | 5-26076 A | 2/1993 |
| JP | 2003-129890 | 5/2003 |

* cited by examiner

*Primary Examiner*—Binh Q. Tran
(74) *Attorney, Agent, or Firm*—Shinjyu Global IP Counselors, LLP

(57) ABSTRACT

An exhaust gas cleaning apparatus for an engine has a NOx trapping catalytic converter and a control unit for controlling an intake air throttle valve and a fuel injection timing in accordance with an operating condition of the engine. The opening degree of the intake air throttle valve is reduced to accomplish rich spike control. The fuel injection timing is adjusted according to the boost pressure that develops downstream of the intake air throttle valve during rich spike control. Since the combustion tends to degrade when the boost pressure changes during rich spike control, the fuel injection timing is advanced more as the boost pressure becomes larger. This advancement of the injection timing compensates for the combustion degradation and prevents the occurrence of torque fluctuations when the opening degree of the throttle valve is adjusted during the shift to rich spike control to improve the engine operating performance.

16 Claims, 4 Drawing Sheets

EXHAUST GAS CLEANING APPARATUS

BACKGROUND OF THE INVENTION

1. Field of the Invention

The present invention generally relates to an engine exhaust gas cleaning apparatus. More specifically, the present invention relates to an improvement to exhaust gas cleaning apparatuses for engines equipped with a NOx trapping catalytic converter in the exhaust system.

2. Background Information

In internal combustion engines such as diesel engines, an exhaust gas recirculating system (EGR system) is widely used wherein a part of the exhaust gas is recirculated to lower the combustion temperature in order to reduce discharge of nitrogen oxide (NOx). Some prior exhaust systems for diesel engines often include a diesel particulate filter (DPF) and a NOx trapping catalytic converter that are disposed in an exhaust passage. The diesel particulate filter (DPF) traps particulate matters (PM) in the exhaust gas, while the NOx trapping catalytic converter traps NOx in the exhaust gas when an air-fuel ratio in the exhaust gas is in a lean range and purifies the trapped NOx when the air-fuel ratio is in a rich range.

Thus, an engine having a NOx trapping catalytic converter normally operates with lean combustion and the NOx generated during that operation are captured in a NOx absorbing agent. When a certain amount of NOx has accumulated, the excess air ratio λ of the exhaust gas is temporarily changed to a rich value to desorb and deoxidize the NOx from the absorbing agent. This control of the excess air ratio λ of exhaust gas being recirculated that temporarily shifts the value of the excess air ratio λ to a rich value is called "rich spike control."

Diesel engines are normally operated with an excess air ratio λ of approximately 2 to 3, which corresponds to a lean air fuel ratio. During rich spike control, the value of the excess air ratio λ is changed to approximately 0.8. Rich spike control is normally executed with non-regular timing in response to engine operating conditions to treat the NOx accumulated in the NOx trapping catalytic converter. In other words, rich spike control is not executed in response to a request that is issued by the driver. Consequently, the driver will experience a feeling of discomfort if the torque fluctuates during the shift from the normal operating state to the rich spike control state. Therefore, in order to reduce the value of the excess air ratio λ while changing the fuel delivery quantity as little as possible, the rich spike control is designed to reduce the quantity of intake air by reducing the opening degree of a throttle valve provided in an intake passage, as disclosed in Japanese Laid-Open Patent Publication No. 2003-129890.

In view of the above, it will be apparent to those skilled in the art from this disclosure that there exists a need for an improved engine exhaust gas cleaning apparatus. This invention addresses this need in the art as well as other needs, which will become apparent to those skilled in the art from this disclosure.

SUMMARY OF THE INVENTION

It has been discovered that when the opening degree of the intake air throttle valve is reduced in order to execute the rich spike control, a negative pressure in the air intake pipe downstream of the throttle valve (hereinafter called "boost pressure") increases. This change in boost pressure causes pumping loss, combustion degradation, and fluctuations in the engine output characteristic. More specifically, since the reduction in intake air quantity causes the effective compression ratio and the compression end temperature to decline and causes the ignition delay to become large, the peak heat generation is late and combustion fluctuations occur due to misfiring. Since conventional control designs do not take into consideration the effect of the change in boost pressure, these conventional control designs allow torque fluctuations to occur during the shift to the rich spike control.

The present invention applies to an exhaust gas cleaning apparatus that has a NOx trapping catalytic converter and that is configured to reduce the opening degree of an intake air throttle valve when rich spike control is executed in order to desorb the NOx that is trapped in the NOx trapping catalytic converter. Thus, the present invention features an engine exhaust gas cleaning apparatus that adjusts the fuel injection timing in accordance with the quantity of intake air drawn into the cylinders during rich spike control.

In view of the forgoing, an engine exhaust gas cleaning apparatus is provided for an engine that basically comprises a NOx trapping catalytic converter, an intake air throttle valve and a control unit. The NOx trapping catalytic converter is disposed in an exhaust passage of the engine to trap NOx from exhaust flowing from the engine. The intake air throttle valve is disposed in an air intake passage of the engine to control an intake air quantity of air flowing into the engine. The control unit is configured to control the intake air throttle valve and a fuel injection timing in accordance with an operating condition of the engine. The control unit includes a rich spike control section, a cylinder intake air quantity determining section and a fuel injection timing adjusting section. The rich spike control section is configured to selectively reduce an opening degree of the intake air throttle valve to reduce an excess air ratio such that the NOx accumulated in the NOx trapping catalytic converter is desorbed. The cylinder intake air quantity determining section is configured to determine a representative value of a cylinder intake air quantity. The fuel injection timing computing section is configured to compute the fuel injection timing based on the operating condition of the engine. The fuel injection timing adjusting section is configured to adjust the fuel injection timing using a boost during rich spike control.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
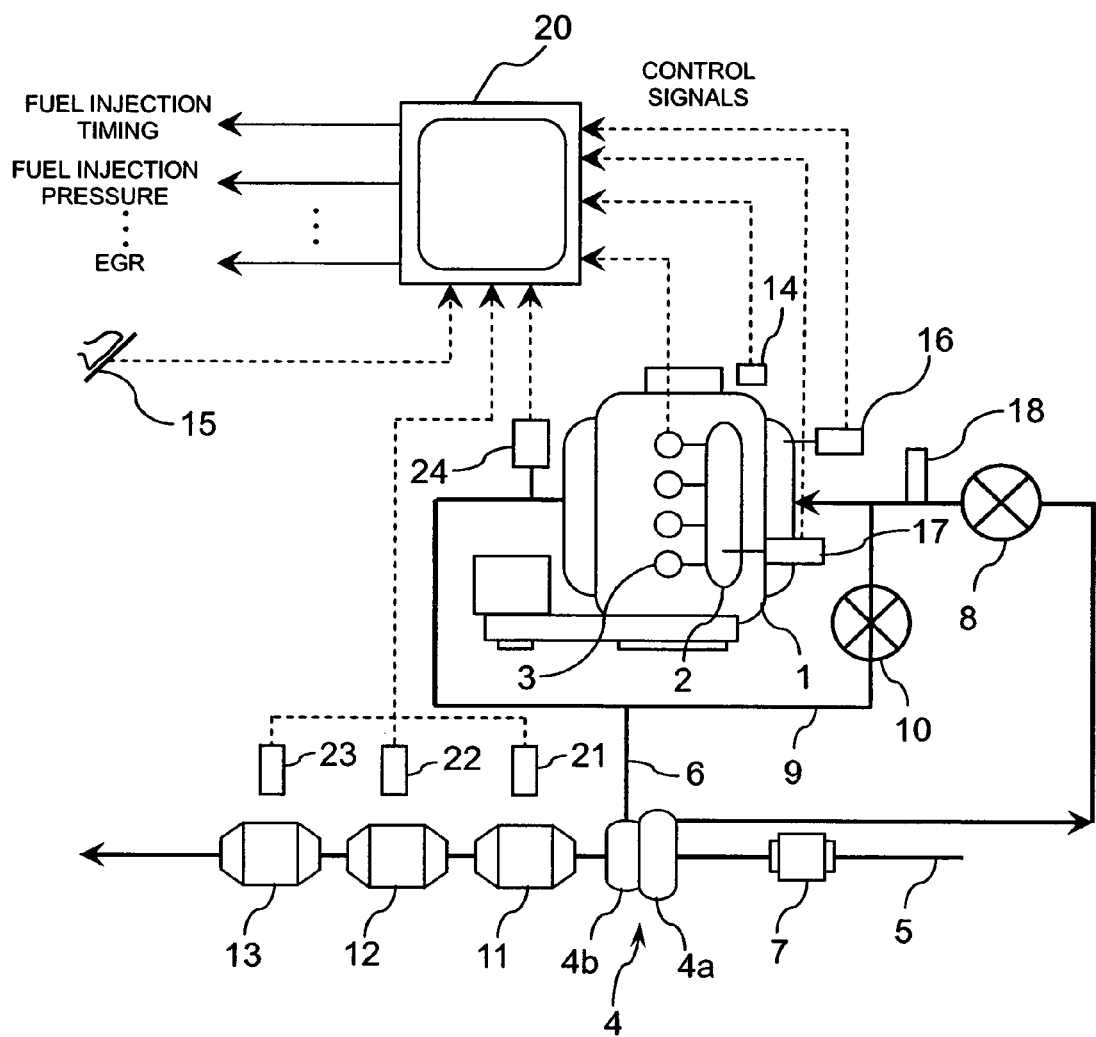
FIG. 1 is a diagrammatic view of an exhaust gas cleaning apparatus or system for an internal combustion engine, e.g., a diesel engine, in accordance with one embodiment of the present invention.

Referring initially to FIG. 1, an exhaust gas cleaning apparatus or system is illustrated for an internal combustion engine such as a supercharged diesel engine 1 in accordance with a first embodiment of the present invention. The exhaust gas cleaning apparatus in accordance with the present invention can be applied to other internal combustion engines used in automobiles and the like.

Basically, in the exhaust gas cleaning apparatus or system of the present invention, the fuel injection timing is normally adjusted in such a manner that the larger the boost pressure becomes, the more advanced the fuel injection timing becomes. This adjustment is made by the exhaust gas cleaning apparatus or system of the present invention, as explained later, because combustion tends to degrade due to the change in boost pressure when the rich spike control is executed. Thus, this adjustment makes it possible to keep the timing of the peak heat generation the same as the normal timing even if the ignition delay becomes large due to the change in boost pressure. As a result, the engine operating performance can be improved because the occurrence of torque fluctuations is avoided when the opening degree of the throttle valve is adjusted during the shift to rich spike control.

As shown in to FIG. 1, the engine 1 includes a common rail fuel injection system including a common rail 2, a plurality of fuel injection valves 3, and a high-pressure fuel pump (not shown) so as to be supplied with pressurized fuel. The fuel pump (not shown) pumps fuel to the common rail 2, where the pressurized fuel accumulates, and high-pressure fuel is delivered to the inside of the combustion chambers when the fuel injection valves 3 are opened. Thus, the fuel injection valves 3 inject fuel directly into respective combustion chambers (not shown) of each cylinder.

The fuel injection valves 3 are configured and arranged to execute a pilot injection before the main injection or executing a post-injection following the main injection. By changing the accumulation pressure of the common rail 2, the fuel injection pressure can be controlled in a variable manner.

A turbocharger (supercharger) 4 having a compressor 4a is arranged in an air intake passage 5 of the air intake system. The compressor 4a serves to pressurize the intake air. The compressor 4a is rotated by a turbine 4b that is driven by exhaust gas flowing through an exhaust passage 6. The supercharger 4 is positioned downstream of an air flow meter 7 in the air intake passage 5 of the engine 1. Preferably, the supercharger 4 is a variable-capacity type supercharger having a variable nozzle provided on the turbine 4b. By using a variable-capacity type supercharger 4, the variable nozzle can be constricted when the engine 1 is operating in a low speed region to increase the turbine efficiency. The variable nozzle of the supercharger 4 can be opened when the engine 1 is operating in a high speed region to increase the turbine capacity. Thus, this arrangement enables a high supercharging effect to be obtained over a wide range of operating conditions.

An intake air throttle valve 8 is installed inside the air intake passage 5 at a location downstream of the compressor 4a. The intake air throttle valve 8 serves to make it possible to control the quantity of intake air drawn into the engine 1. The intake air throttle valve 8 is, for example, an electronically controlled throttle valve whose opening degree can be varied freely using a stepper motor.

The exhaust passage 6 is provided with an exhaust gas recirculation (EGR) passage 9 that branches from a position between the engine 1 and the turbine 4b. The EGR passage 9 connects to the air intake passage 5 downstream of the intake air throttle valve 8.

The exhaust system is provided with an exhaust gas recirculation (EGR) control valve 10 that is installed in the EGR passage 9. The EGR valve 10 serves to control the exhaust gas recirculation quantity in accordance with the engine operating conditions. The EGR valve 10 is electronically controlled using a stepper motor such that the opening degree of the EGR valve 10 regulates the flow rate of the exhaust gas recirculated to the air intake system, i.e., the EGR quantity drawn into the engine 1. The EGR valve 10 is feedback (closed-loop) controlled to regulate the EGR quantity in such a manner as to achieve an EGR ratio set in accordance with the operating conditions.

The flow rate of the air drawn into the engine main body 1 is determined according to the engine rotational speed at that particular time, which depends on the fuel injection quantity, and is equal to the total of the flow rate of fresh air from upstream of the intake air throttle valve 8 (hereinafter also called simply "intake air quantity") and the flow rate of recirculated exhaust gas (hereinafter called "EGR quantity") introduced downstream of the intake air throttle valve 8. Assuming the engine operating state does not change, the total flow rate does not change and, therefore, the fresh air intake flow rate decreases when the EGR quantity increases and increases when the EGR quantity decreases. The fresh air intake flow rate also changes depending on the opening degree of the intake air throttle valve 8, the fresh air intake flow rate being maximum when the intake air throttle valve 8 is fully open and decreasing as the opening degree becomes smaller.

Thus, once the target EGR ratio is determined, the target intake air quantity at that particular time, i.e., the target fresh air intake flow rate, is determined depending on the fuel injection quantity and the opening degree of the intake air throttle valve. As a result, the EGR quantity is relatively large when the actual intake air quantity is smaller than the target intake air quantity and, conversely, the EGR quantity is small when the actual intake air quantity is larger than the target intake air quantity.

Therefore, the EGR ratio can be feedback controlled by comparing the target intake air quantity to the actual intake air quantity that is measured and outputted by the air flow meter 7.

The exhaust system is also provided with an oxidation catalytic converter 11 having an HC adsorbing function, a NOx trapping catalytic converter 12 having a NOx trapping function, and an exhaust gas fine particle capturing filter (DPF=diesel particulate filter) 13 arranged in sequence in the exhaust passage 6 at a position downstream of the turbine 4b of the turbocharger 4.

The oxidation catalytic converter 11 has the characteristic of adsorbing exhaust HCs when the temperature is low and releasing the HCs when the temperature is high and it functions to oxidize HCs and CO when in an active state. The NOx trapping catalytic converter 12 adsorbs or traps NOx contained in the exhaust gas when the excess air ratio $\lambda$ is greater than 1, i.e., when the air fuel mixture is lean, and releases the NOx when the excess air ratio $\lambda$ is rich. The NOx trapping catalytic converter 12 also functions to deoxidize the NOx when in an active state. The exhaust gas particulate filter 13 captures fine particles (PM=particulate matter) contained in the exhaust gas and the captured PM is combusted by raising the exhaust gas temperature using regeneration control.

A control unit 20 is provided to control the exhaust gas cleaning apparatus of the present invention. In particular, the control unit 20 determines and sets the intake air quantity Qa, the fuel injection quantity Qf and the injection timing IT based on detection signals from various sensors (described below) that serve to detect the operating state of the engine 1 and executes the controls based on these signals. Thus, the control unit 20 also controls the drive of the fuel injection valves 3, controls the opening degree of the intake throttle valve 8 and the EGR valve 10 in response to detection signals from various sensors (described below).

The control unit 20 is a microcomputer comprising of a central processing unit (CPU) and other peripheral devices. The control unit 20 can also include other conventional components such as an input interface circuit, an output interface circuit, and storage devices such as a ROM (Read Only Memory) device and a RAM (Random Access Memory) device. The control unit 20 preferably includes an engine control program that controls various components as discussed below. The control unit 20 receives input signals from various sensors (described below) that serve to detect the operating state of the engine 1 and executes the aforementioned controls based on these signals. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The intake air quantity Qa is detected by the air flow meter 7, which outputs a signal to the control unit 20 that is indicative of the intake air quantity Qa. The control unit 20 is also operatively coupled to a rotational speed sensor 14, an accelerator position sensor 15, an engine coolant temperature sensor 16, a rail pressure sensor 17, a pressure sensor 18, a plurality of exhaust system temperature sensors 21, 22 and 23, and an exhaust gas sensor or oxygen sensor 24. The rotational speed sensor 14 is configured and arranged to detect the engine rotational speed Ne of the engine 1, and output a signal to the control unit 20 that is indicative of the engine rotational speed Ne of the engine 1. The accelerator position sensor 15 is configured and arranged to detect the accelerator position APO, and output a signal to the control unit 20 that is indicative of the accelerator position APO.

The coolant temperature sensor 16 is configured and arranged to detect the temperature of the engine coolant Tw, and output a signal to the control unit 20 that is indicative of the temperature of the engine coolant Tw. The rail pressure sensor 17 is configured and arranged to detect the fuel pressure (fuel injection pressure) inside the common rail 2, and output a signal to the control unit 20 that is indicative of the fuel pressure (fuel injection pressure) inside the common rail 2. The pressure sensor 18 is configured and arranged to detect the pressure in the air intake passage 5 downstream of the intake air throttle valve 8, and output a signal to the control unit 20 that is indicative of the intake air pressure inside the air intake passage 5 downstream of the intake air throttle valve 8. The temperature sensors 21, 22 and 23 are configured and arranged to detect the exhaust gas temperature in the general vicinity of the outlets of the oxidation catalytic converter 11, the NOx trapping catalytic converter 12, and the particulate filter 13, respectively. The temperature sensors 21, 22 and 23 are configured and arranged to output signals to the control unit 20 that are indicative of the exhaust gas temperature in the general vicinity of the outlets of the oxidation catalytic converter 11, the NOx trapping catalytic converter 12, and the particulate filter 13, respectively. The exhaust gas sensor 24 is configured and arranged in the exhaust passage 6 at a position upstream of the turbine 4b to detect the air fuel ratio or the oxygen concentration of the exhaust gas. The exhaust gas sensor 24 is configured and arranged to output a signal to the control unit 20 that is indicative of the air fuel ratio or the oxygen concentration of the exhaust gas.

Accordingly, the control unit 20 controls the regeneration of the NOx trapping catalytic converter 12 and the particulate filter 13. In other words, the control unit 20 controls the fuel injection quantity Qf delivered by the fuel injection valves 3, the injection timing IT of the fuel injection valves 3 and the intake air quantity Qa. The control unit 20 is also operated in accordance with various engine operating conditions (e.g., accelerator position). The control unit 20 further controls the opening degree of the intake air throttle valve 8 and the EGR valve 10 in accordance with various engine operating conditions. The control unit 20 further controls the regeneration of the NOx trapping catalytic converter 12 by determining when the total NOx absorbed to the NOx trapping catalytic converter 12 has reacted a prescribed value and, when the prescribed value is reached, executing regeneration control to shift the excess air ratio $\lambda$ to a rich value and thereby desorb and deoxidize the NOx. In particular, as relates to the present invention, the control unit 20 executes rich spike control to regenerate (i.e., desorb the NOx of) the NOx trap catalyst 12 and fuel injection timing control. In relation to the present invention, the control unit 20 carries out the functions of the rich spike control section, the boost pressure detecting section, the fuel injection timing computing section, and the fuel injection timing adjusting section.

The control unit 20 further controls the regeneration of the particulate filter 13 by executing regeneration control to raise the exhaust gas temperature and thereby combust/remove the particulate matter when the amount of particulate matter captured in the particulate filter 13 has reached a prescribed amount.

Figure 2:
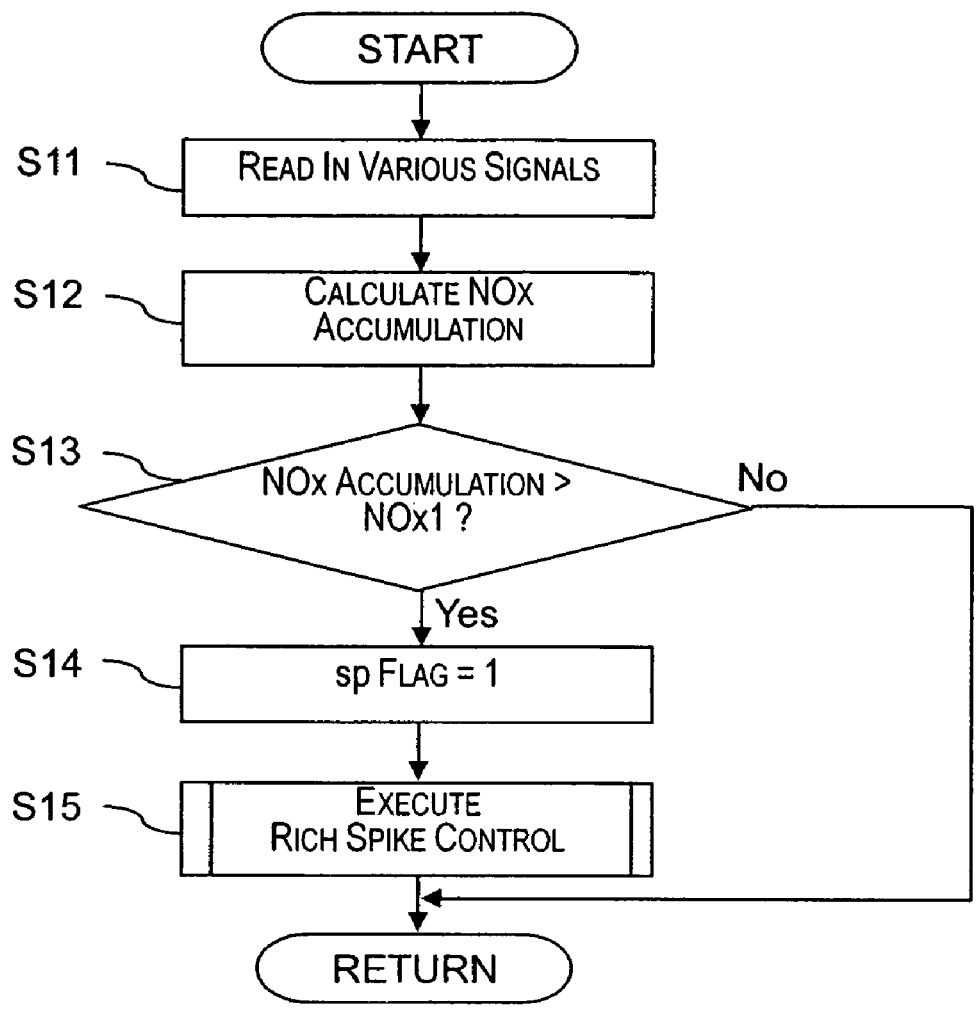
FIG. 2 is a first flowchart showing the control operations executed by the control unit of the exhaust gas cleaning apparatus or system in accordance with the present invention in order to determine when to regenerate the NOx trapping catalytic converter.
Figure 3:
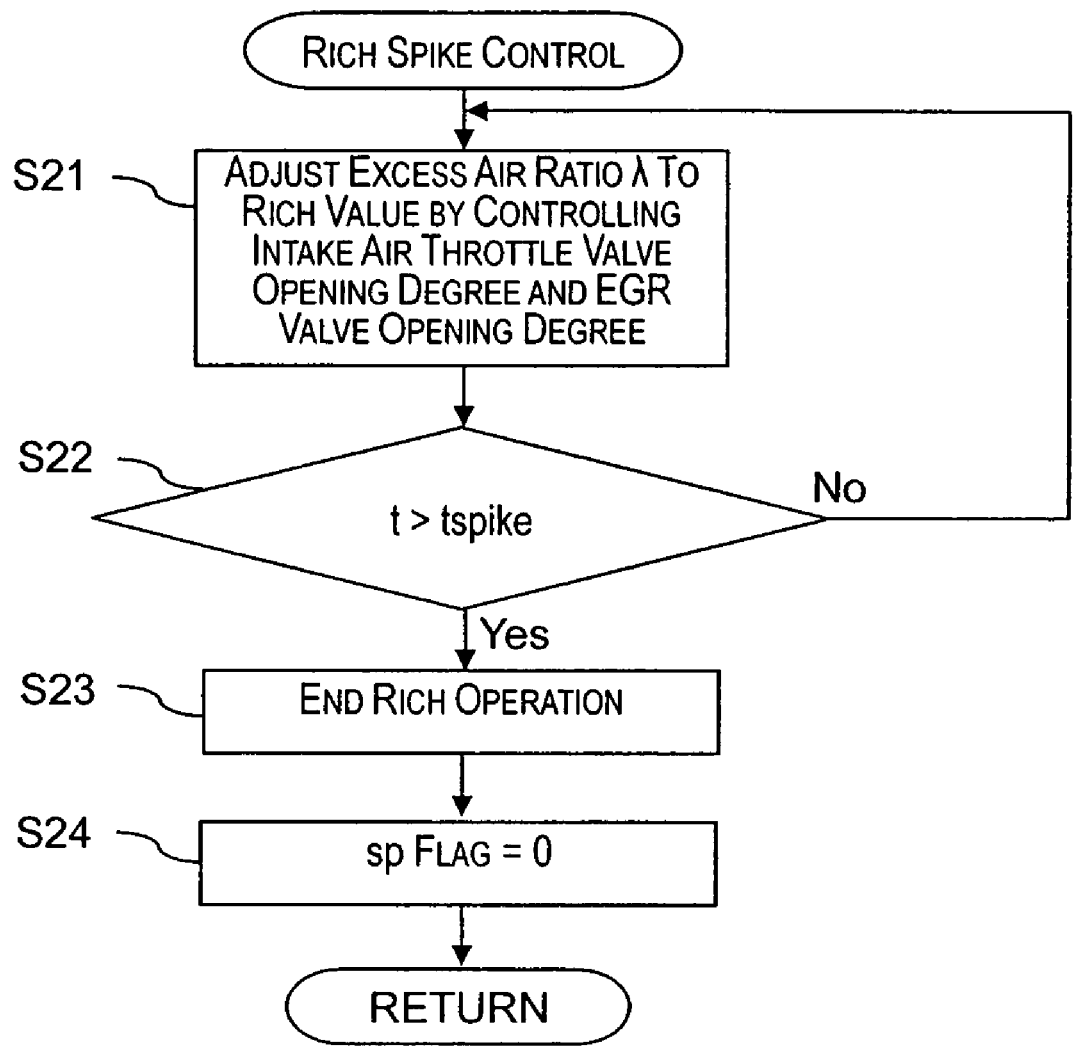
FIG. 3 is a second flowchart showing the control operations of the rich spike control executed by the control unit of the exhaust gas cleaning apparatus or system in accordance with the present invention in order to regenerate the NOx trapping catalytic converter.

As shown in FIGS. 2 and 3, the control unit 20 executes the rich spike control to regenerate or desorb the NOx that is trapped in the NOx trapping catalytic converter 12 and the fuel timing control. The cylinder intake air quantity changes when the control routines are executed by the control unit 20 to perform the rich spike control and the fuel timing control. During the rich spike control (lean operation to rich operation), the pressure and the temperature of the intake air in the cylinders decrease. In other words, the cylinder intake air quantity decreases during the rich spike control such that a pressure differential occurs between lean operation and rich operation. This pressure differential is the boost pressure. Also, during the rich spike control (lean operation to rich operation), the fuel injection timing is advanced by the control unit 20 because combustion becomes more difficult with the decrease in the cylinder intake air quantity.

In the present invention, the control unit 20 carries out the functions of rich spike control, boost pressure (a representative value of cylinder intake air quantity) detecting, fuel injection timing computing and fuel injection adjusting. Thus, the control unit 20 constitutes the rich spike control section, the boost pressure detecting section, the fuel injection timing computing section, and the fuel injection timing adjusting section.

The flow charts of FIGS. 2 and 3 illustrate the control routines executed by the control unit 20 to carry out these functions. These control routines of FIGS. 2 and 3 are periodically executed in a cyclic manner at a prescribed fixed time interval when the engine 1 is operating in accordance with certain predetermined engine operating conditions, e.g., when the engine 1 is operating in a low-load, low-speed state, including idling. Now, the control routines of FIGS. 2 and 3 will be discussed for the executing the rich spike control by the control unit 20.

In step S11, the control unit 20 reads in various signals from each of the sensors shown in FIG. 1 that represent engine operating conditions including, but not limited to, the engine rotational speed Ne, the accelerator position APO, the fuel injection quantity, and the engine coolant temperature. In other words, the engine operating state, e.g., load condition and rotational speed condition, of the engine 1 is determined by the control unit 20 receiving signals from each of the sensors shown in FIG. 1.

In step S12, the control unit 20 calculates the amount of NOx accumulated (adsorbed) in the NOx trapping catalytic converter 12 using theses signals from the sensors of FIG. 1. There are various known methods of calculating the NOx accumulation amount. For example, the NOx quantity can be estimated based on signals indicating such operating conditions as the engine rotational speed Ne, the fuel injection quantity Qf, and the coolant temperature Tw and/or the NOx accumulation amount can be calculated by integrating the NOx quantity in accordance with the operation history.

In step S13, the control unit 20 compares the calculated NOx accumulation amount to a reference value NOx1. If the NOx accumulation amount is equal to or less than NOx1, then the control unit 20 ends the current cycle of the routine without performing the rich spike control. If the control unit 20 determines the NOx accumulation amount is greater than NOx1, then the control unit 20 proceeds to step S14. In step S14, the control unit 20 sets the sp flag to a value of 1 to indicate that rich spike control is in progress. Then, in step S15, the control unit 20 executes the rich spike control routine.

FIG. 3 shows the rich spike control routine of step S15. In step S21, the control unit 20 executes control to reduce the opening degrees of the intake air throttle valve 8 and the EGR valve 10 in order to control the excess air ratio λ of the engine 1 to a rich value below the stoichiometric excess air ratio. In some cases, to satisfy the need to achieve the target excess air ratio λt, a post fuel injection is executed in order to add fuel during the period between late in the combustion stroke and the exhaust stroke. The NOx that accumulated in the NOx trapping catalytic converter 12 while the engine operated with lean combustion using a large excess air ratio λ is desorbed from the NOx absorbing agent due to the enriched excess air ratio value resulting from the rich spike control, and the desorbed NOx is cleaned by the deoxidizing treatment that occurs in the catalyst.

In step S22, the control unit 20 determines if the time t that has elapsed since starting the rich spike control has reached a reference value tspike. The reference value tspike establishes the amount of time over which rich spike control will be executed. Thus, the reference value tspike is set in advance based on the NOx accumulation amount. The control unit 20 continues executing the rich spike control of step S21 until the time value t of the elapsed time timer exceeds the reference value tspike. When time t exceeds the reference value tspike, the control unit 20 ends the rich spike control in step S23 and sets the sp flag to 0 in step S24. Then, the control unit 20 resets the time value t of the elapsed time timer and returns to the routine shown in FIG. 2. Although omitted in FIG. 3, the rich spike control routine also includes processing steps for such tasks as initializing the time value t of the elapsed time timer, incrementing the value t each time the control loop is executed, and initializing the NOx accumulation amount after the rich spike treatment has ended.

The preceding explanation provides an overview of the rich spike control for regeneration of the NOx trapping catalytic converter 12. In order to curb the combustion degradation and torque fluctuations that can accompany this kind of the rich spike control, the present invention executes control to revise the fuel injection timing in accordance with the boost pressure. This fuel injection timing adjustment control will now be described in detail with reference to the flowchart shown in FIG. 4.

Figure 4:
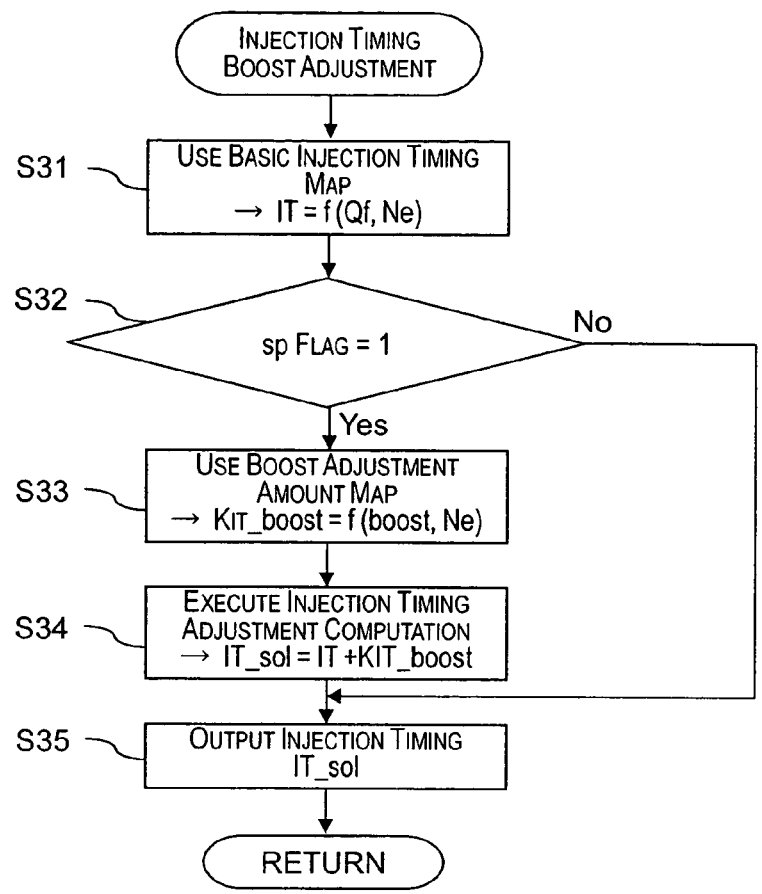
FIG. 4 is a third flowchart showing the control operations of the fuel injection timing adjustment control executed by the control unit of the exhaust gas cleaning apparatus or system in accordance with the present invention in order to regenerate the NOx trapping catalytic converter.

Similarly to the routines shown in FIGS. 2 and 3, the control routine shown in FIG. 4 executed by the control unit 20 for adjusting the fuel injection timing. In step S31, the control unit 20 determines the basic fuel injection timing IT. This processing involves using a preset map that provides the basic fuel injection timing IT based on the fuel injection quantity Qf and the engine rotational speed Ne. The fuel injection quantity Qf is a value calculated by the fuel injection control system and the engine rotational speed Ne is a value measured by the rotational speed sensor 14. Both the values for the fuel injection quantity Qf and the engine rotational speed Ne are read in by the control unit 20.

In step S32, the control unit 20 checks the sp flag. As previously mentioned above, the sp flag indicates whether or not rich spike control is in progress. When the value of the sp flag is 0, the rich spike control is not in progress and the basic fuel injection timing IT is outputted as the injection timing command value IT_sol without adjusting the basic fuel injection timing IT based on the boost pressure of the intake air. Although omitted from the figures, the basic fuel injection timing IT is adjusted based on the values of the excess air ratio λ, the EGR ratio, and the coolant temperature as necessary during the period up until the basic fuel injection timing IT is finally outputted as the command value IT_sol.

When the sp flag is found to be 1 in step S32, then the rich spike control is in progress and the control unit 20 proceeds to step S33 to execute processing for adjusting the fuel injection timing based on determining a representative value of a cylinder intake air quantity.

In step S33, the control unit 20 preferably refers to a preset map that gives an injection timing advancing adjustment amount KIT_boost based on the engine rotational speed Ne and the boost pressure, which indicates the quantity of intake air that is drawn into the cylinder. In other words, the boost pressure is one example of a representative value of a cylinder intake air quantity. Thus, the control operations performed in step S33 by the control unit 20 constitutes a cylinder intake air quantity determining section configured to determine a representative value of a cylinder intake air quantity.

The boost pressure can be determined in several different ways. The boost pressure is found by calculating the difference between atmospheric pressure and the pressure measured by the intake air pressure sensor 18 inside an air intake pipe downstream of the throttle valve 8 or by computing a ratio of the intake air quantity when the throttle valve 8 is fully open and the intake air quantity when the throttle valve 8 is constricted. If the engine 1 is configured to execute EGR as shown in FIG. 1, the total intake air quantity will be the sum of the intake air quantity and the EGR quantity. Using the intake air pressure sensor 18 allows the boost pressure to be detected directly, but the response delay between the change in the opening degree of the throttle valve 8 and the actual change in the intake air quantity tends to cause error to occur. Conversely, since the ratio of the intake air quantities is calculated based on the opening degrees of the throttle valve 8 and the EGR valve 10, a highly precise boost pressure value can be obtained without being influenced by the response delay.

Figure 5:
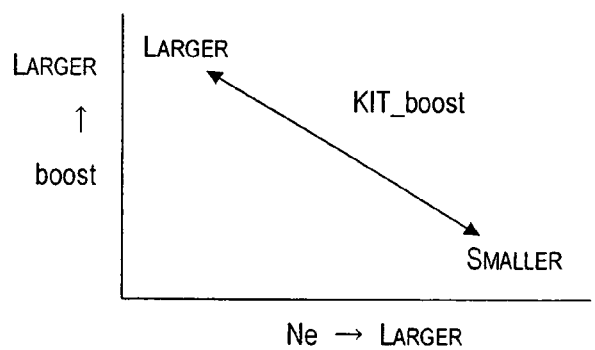
FIG. 5 is a map providing the boost-based injection timing adjustment amount used in the fuel injection timing boost adjustment control that is executed by the control unit of the exhaust gas cleaning apparatus or system in accordance with the present invention.

FIG. 5 shows an example of a map that provides the advancing adjustment amount KIT_boost. The KIT_boost characteristic is as shown in FIG. 5, i.e., the amount of advancement becomes larger as the engine rotational speed Ne decreases and as the boost pressure (negative pressure) increases. The KIT_boost characteristic shown in the figure, however, is merely a general characteristic and a more precise KIT_boost characteristic depends on the engine characteristics and the operating state at the time when rich spike control is executed. Thus, the KIT_boost characteristic is shown as a linear function in FIG. 5 for the sake of simplicity. The actual KIT_boost characteristic will be obtained on a case by case basis.

In step S34, the control unit 20 adds the advancing adjustment amount KIT_boost to the basic fuel injection timing IT and sets the resulting sum as the injection timing command value IT_sol. In step S35, the control unit 20 outputs the adjusted command value IT_sol.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-282954. The entire disclosure of Japanese Patent Application No. 2003-282954 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An exhaust gas cleaning apparatus for an engine comprising:
    a NOx trapping catalytic converter disposed in an exhaust passage of the engine to trap NOx from exhaust flowing from the engine;
    an intake air regulating device disposed in an air intake passage of the engine to control an intake air quantity of air flowing into the engine; and
    a control unit configured to control the intake air regulating device and a fuel injection timing in accordance with an operating condition of the engine, the control unit including
        a rich spike control section configured to selectively reduce an opening degree of the intake air regulating device to reduce an excess air ratio such that the NOx accumulated in the NOx trapping catalytic converter is desorbed,
        a cylinder intake air quantity determining section configured to determine a representative value of a cylinder intake air quantity,
        a fuel injection timing computing section configured to compute the fuel injection timing based on the operating condition of the engine, and
        a fuel injection timing adjusting section configured to adjust the fuel injection timing based on the representative value of the cylinder intake air quantity during rich spike control.

2. The exhaust gas cleaning apparatus as recited in claim 1, wherein
    the cylinder intake air quantity determining section is configured to determine the representative value of the cylinder intake air quantity based on a boost pressure that occurs during the rich spike control by the intake air regulating device.

3. The exhaust gas cleaning apparatus as recited in claim 2, wherein
    the fuel injection timing adjusting section is configured to determine an injection timing adjustment amount using a stored map of the injection timing adjustment amount based on an air intake passage pressure and an engine rotational speed.

4. The exhaust gas cleaning apparatus as recited in claim 2, wherein
    the fuel injection timing computing section is configured to use determined values of a fuel injection quantity and an engine rotational speed as the operating condition of the engine to determine the fuel injection timing.

5. The exhaust gas cleaning apparatus as recited in claim 2, wherein
    the cylinder intake air quantity determining section is further configured to detect a negative pressure in the air intake passage with a pressure sensor as the boost pressure, and to use the boost pressure that was detected to determine the representative value of the cylinder intake air quantity.

6. The exhaust gas cleaning apparatus as recited in claim 5, wherein
the fuel injection timing adjusting section is configured to determine an injection timing adjustment amount using a stored map of the injection timing adjustment amount based on an air intake passage pressure and an engine rotational speed.

7. The exhaust gas cleaning apparatus as recited in claim 5, wherein
the fuel injection timing computing section is configured to use determined values of a fuel injection quantity and an engine rotational speed as the operating condition of the engine to determine the fuel injection timing.

8. The exhaust gas cleaning apparatus as recited in claim 1, wherein
the cylinder intake air quantity determining section is configured to compute a ratio of the intake air quantity when the intake air regulating device is fully open and the intake air quantity during the rich spike control, and to use the ratio that was computed to determine the representative value of the cylinder intake air quantity.

9. The exhaust gas cleaning apparatus as recited in claim 8, wherein
the cylinder intake air quantity determining section is configured to compute the representative value of the cylinder intake air quantity as a total of a quantity of fresh intake air and a quantity of EGR.

10. The exhaust gas cleaning apparatus as recited in claim 8, wherein
the fuel injection timing adjusting section is configured to determine an injection timing adjustment amount using a stored map of the injection timing adjustment amount based on an air intake passage pressure and an engine rotational speed.

11. The exhaust gas cleaning apparatus as recited in claim 8, wherein
the fuel injection timing computing section is configured to use determined values of a fuel injection quantity and an engine rotational speed as the operating condition of the engine to determine the fuel injection timing.

12. The exhaust gas cleaning apparatus as recited in claim 1, wherein
the fuel injection timing adjusting section is configured to determine an injection timing adjustment amount using a stored map of the injection timing adjustment amount based on an air intake passage pressure and an engine rotational speed.

13. The exhaust gas cleaning apparatus as recited in claim 1, wherein
the fuel injection timing computing section is configured to use determined values of a fuel injection quantity and an engine rotational speed as the operating condition of the engine to determine the fuel injection timing.

14. The exhaust gas cleaning apparatus as recited in claim 1, wherein
the intake air regulating device is a throttle valve.

15. An exhaust gas cleaning apparatus for an engine comprising:
NOx trapping means for trapping NOx from exhaust flowing in an exhaust passage of the engine;
intake air regulating means for regulating an intake air quantity of air flowing into the engine; and
control means for controlling the intake air regulating means and a fuel injection timing in accordance with an operating condition of the engine, the control means being configured to
selectively reduce an opening degree of the intake air regulating means to reduce an excess air ratio such that the NOx accumulated in the NOx trapping means is desorbed,
determine a representative value of a cylinder intake air quantity,
compute the fuel injection timing based on the operating condition of the engine, and
adjust the fuel injection timing based on the representative value of the cylinder intake air quantity during rich spike control.

16. A method for cleaning exhaust gas of an engine comprising:
trapping NOx from exhaust flowing in an exhaust passage of the engine;
regulating an intake air quantity of air flowing into the engine;
controlling the intake air and a fuel injection timing in accordance with an operating condition of the engine;
selectively reducing the intake air quantity of air flowing into the engine to reduce an excess air ratio such that the NOx accumulated in the NOx trapping means is desorbed;
determining a representative value of a cylinder intake air quantity;
computing the fuel injection timing based on the operating condition of the engine; and
adjusting the fuel injection timing based on the representative value of the cylinder intake air quantity during rich spike control.

* * * * *